United States Patent [19]

Haim et al.

[11] Patent Number: 5,446,567
[45] Date of Patent: Aug. 29, 1995

[54] LIQUID CRYSTAL DISPLAY WITH FIRST AND SECOND APERATURES WHERE ONE APERATURE HAS PROTUBERANCES

[75] Inventors: Elias S. Haim; Cecil W. Penn, both of Glendale, Ariz.

[73] Assignee: Honeywell Inc., Minneapolis, Minn.

[21] Appl. No.: 35,992

[22] Filed: Mar. 23, 1993

[51] Int. Cl.[6] .......................................... G02F 1/1335
[52] U.S. Cl. ...................................... 359/49; 359/67; 359/70
[58] Field of Search ............................... 359/49, 67, 70

[56] References Cited

U.S. PATENT DOCUMENTS 4,948,231  8/1990  Aoki et al. ..................... 359/67

FOREIGN PATENT DOCUMENTS 3256025  11/1991  Japan ..................................... 359/70
5100222   4/1993  Japan ..................................... 359/70

Primary Examiner—William L. Sikes
Assistant Examiner—Ron Trice
Attorney, Agent, or Firm—Seymour Levine; Ronald E. Champion; Albin Medved

[57] ABSTRACT

The liquid crystal display includes a patterned mirror disposed between the backlight assembly and the black matrix to reflect light back into the backlight assembly that otherwise would impinge on the black matrix. Apertures through the patterned mirror are so shaped that parallax effects with respect to the black matrix provides desirable luminance versus viewing angle profiles.

2 Claims, 4 Drawing Sheets

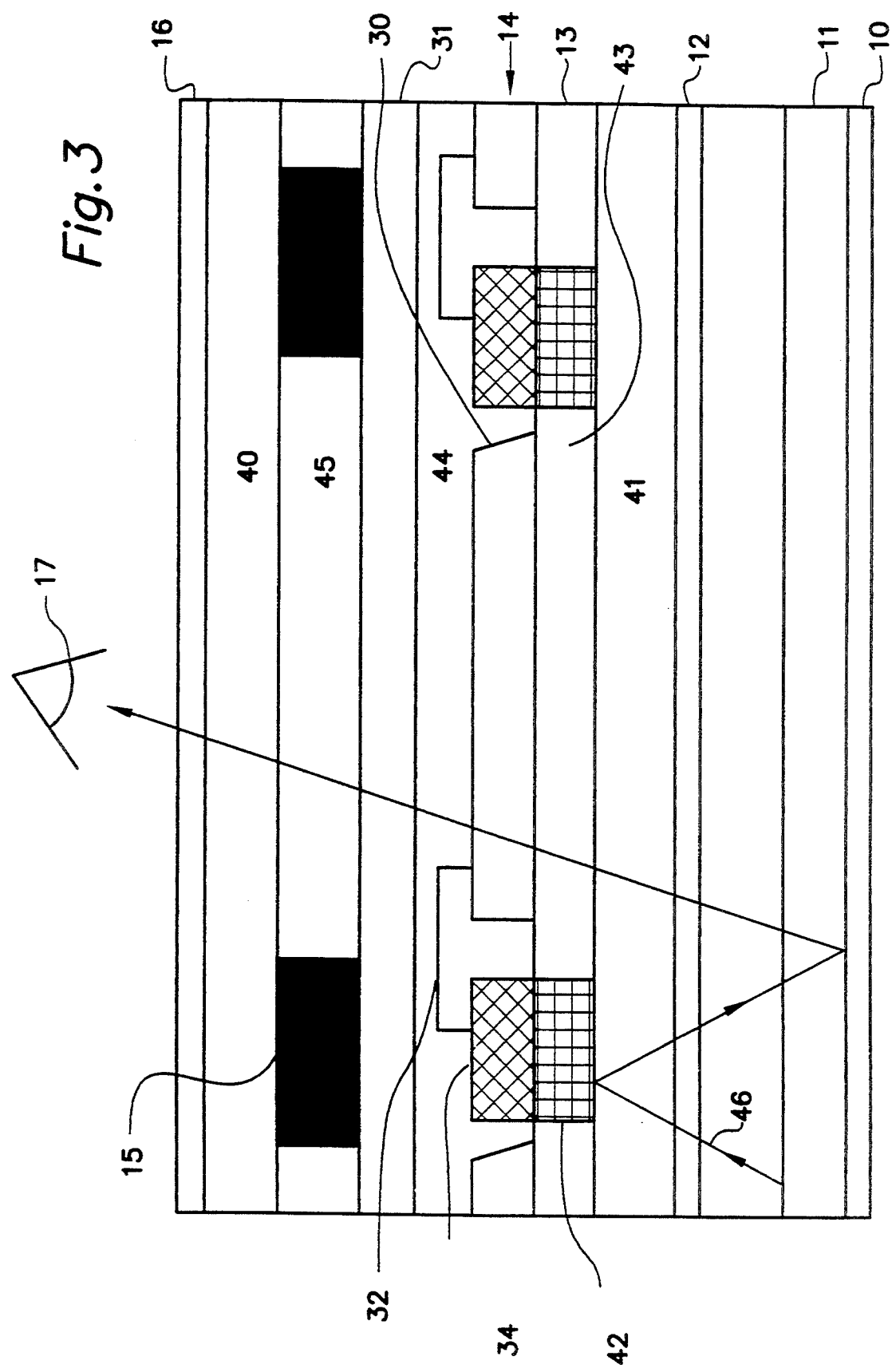

LIQUID CRYSTAL DISPLAY WITH FIRST AND SECOND APERATURES WHERE ONE APERATURE HAS PROTUBERANCES

BACKGROUND OF THE INVENTION

1. Field of the Invention

The invention relates to displays particularly with respect to liquid crystal monochrome and color displays. Such displays typically are of active matrix configuration.

2. Description of the Prior Art

Backlighted liquid crystal displays (LCD), with, for example, dimmable fluorescent backlight and utilizing twisted-nematic (TN) liquid crystal, have been developed to provide flat panel displays for applications such as aircraft instrumentation, laptop and notebook computers, and the like. Such LCDs typically utilize a back electrode structure in the form of a matrix of transparent metal pixels or dot electrodes and a continuous transparent metal front electrode with the liquid crystal material sandwiched therebetween. The front electrode is often denoted as the common or counter electrode. Each pixel electrode is activated through a switch, usually implemented as a thin film transistor (TFT), which is deposited as a field effect transistor (FET). The drain electrode of each TFT is connected to, or actually forms, the pixel electrode with which it is associated. The gate electrodes of the TFTs in each row of the matrix are commonly connected to a gate bus-line for the row and the source electrodes of the TFTs in each column of the matrix are commonly connected to a source bus-line for the column. An image is created in raster fashion by sequentially scanning the gate bus rows while applying information signals to the source bus columns.

Such an arrangement may provide a monochrome display. Color capability is imparted to the LCD by grouping the pixels into color groups such as triads, quads, and the like, in, for example, diagonal or delta element arrays, and providing color filters at the front surface of the LCD to intercept the light transmitted through the respective pixels. For example, triads with primary color RED, GREEN and BLUE filters are often utilized. By appropriate video control of the gate and source buses various colors are generated.

Backlighted monochrome and color LCD displays have the disadvantage that large light transmission losses occur in the transmission of light from the backlight source through the elements of the display. Light is normally absorbed by non-transmissive areas of the display such as by the black matrix. Typically, only approximately 4% of the light from the backlight source emerges at the front of the display. A large light transmission loss of approximately 90% occurs in the LCD cell structure.

Another disadvantage suffered by such displays is anomalous luminance versus off-axis-angle performance of the display. The LCD off-axis luminance performance of white grayscale luminance versus angle indicates that on-state luminance decreases off axis, whereas off-state luminance increases off axis. It would be desirable for the display to exhibit a flat luminance profile over viewing angle for each grayscale level.

Specifically, with respect to color displays, color LCDs are usually manufactured with a uniform cell gap for all color dots across the display active area. Because of the properties of TN color monogap LCDs, a different level of off-state luminance occurs for each of the color dots. This phenomenon results in undesirably high levels of background luminance. The condition is exacerbated when the display is viewed from varying angles since each color dot changes luminance with viewing angle at different rates, some increasing and some decreasing. This aspect of monogap LCD technology results in high levels of background luminance with viewing angle, producing undesirable secondary effects in viewability of display symbology. Additionally, objectionably different chromaticities of background color for various angles of view result.

Specifically, a RED, GREEN, BLUE (RGB) multicolor display requires an illumination source having strong spectral emissions at 435 nm, 545 nm, and 610 nm. It is impossible to obtain minimum background (off) transmission for all three wavelengths utilizing a display configured with a single cell gap. In such a monogap display, emissions from at least two of the three wavelengths leak through the display background resulting in increased background luminance. This, in turn, results in reduced contrast and a chromatic background.

Prior art techniques to improve the luminance output of LCD displays include using more transmissive polarizers, ITO layers, color filters, and the like; providing ideal rubbing and polarizer orientations; increasing the aperture ratios of the pixels; and utilizing high efficiency backlights. More transmissive elements and high efficiency backlights tend to be expensive, hence increasing the cost of the displays. Increasing the pixel aperture ratios tends to decrease the resolution of the display and hence the clarity thereof. Precise alignments of the rubbing and polarizer orientations require utilization of expensive and hence undesirable manufacturing techniques.

Prior art techniques to improve the luminance versus off-axis-angle performance include backlight designs such as directional diffusers and non-imaging backlight construction. Utilization of these structures tend to undesirably increase the cost of the device.

Other prior art techniques to improve the luminance versus off-axis-angle performance include modifications of the LCD cell such as retardation films, cell gap changes utilizing multi-gap filters and half-toning utilizing half-tone elements. The inclusion of retardation films tends to undesirably increase the cost of the display. The multi-gap construction introduces expensive fabrication techniques to the manufacturing process and in addition may increase image retention and flicker. This aspect of the technology is described in co-pending U.S. patent application Ser. No. 07/850,174; filed Mar. 11, 1992; for Elias S. Haim; entitled "Multi-gap Liquid Crystal Color Display With Reduced Image Retention And Flicker." Said Ser. No. 850,174 is assigned to the assignee of the present invention and is incorporated herein in its entirety. The half-tone construction also tends to undesirably increase the cost of the display because of expensive fabrication techniques and in addition results in gray level non-uniformity across the display. This aspect of the technology is described in U.S. Pat. No. 5,319,480 issued to Richard I. McCartney; entitled "Liquid Crystal Half-tone Display With Gray Level Uniformity." Said U.S. Pat. No. 5,319,480 is assigned to the assignee of the present invention and is incorporated herein in its entirety.

SUMMARY OF THE INVENTION

The invention increases the luminance of, and improves the luminance versus off-axis-angle profiles of, an LCD display by interposing a patterned mirror between the backlight source and a light obstructing member such as the black matrix. The mirror improves the luminance output of the display by reflecting the light that would normally be absorbed by the non-transmissive areas of the display back into the backlight assembly wherein the light is reflected forward from the backlight reflector. Light incident on an LCD cell is either transmitted by the cell and observed by the user or is reflected from the patterned mirror back into the backlight assembly and re-reflected therefrom until the light is incident on a transmitting portion of the LCD cell. Since the light that is normally incident on non-transmissive portions of the display is reflected back into the backlight assembly and re-reflected until transmitted by the LCD cell, an increase in LCD luminance occurs compared to the prior art LCD cell arrangement where the non-transmissive portions absorb incident light. The invention improves luminance without enhancing the transmission characteristics of the LCD cell.

The pattern of the mirror in combination with the parallax between the patterned mirror and the opaque obstruction, such as the black matrix, improves the luminance versus off-axis-angle performance of the display. As an observer moves off axis from the display, the transmission of the LCD cell varies depending upon the obstruction presented by the patterned mirror as seen through the black matrix. The pattern of the mirror is constructed to provide the desired luminance versus viewing angle profiles.

BRIEF DESCRIPTION OF THE DRAWINGS

FIG. 3 is a schematic, cross-sectional elevation view of an LCD color pixel cell including the patterned mirror of the present invention.

DESCRIPTION OF THE PREFERRED EMBODIMENT

Figure 1:
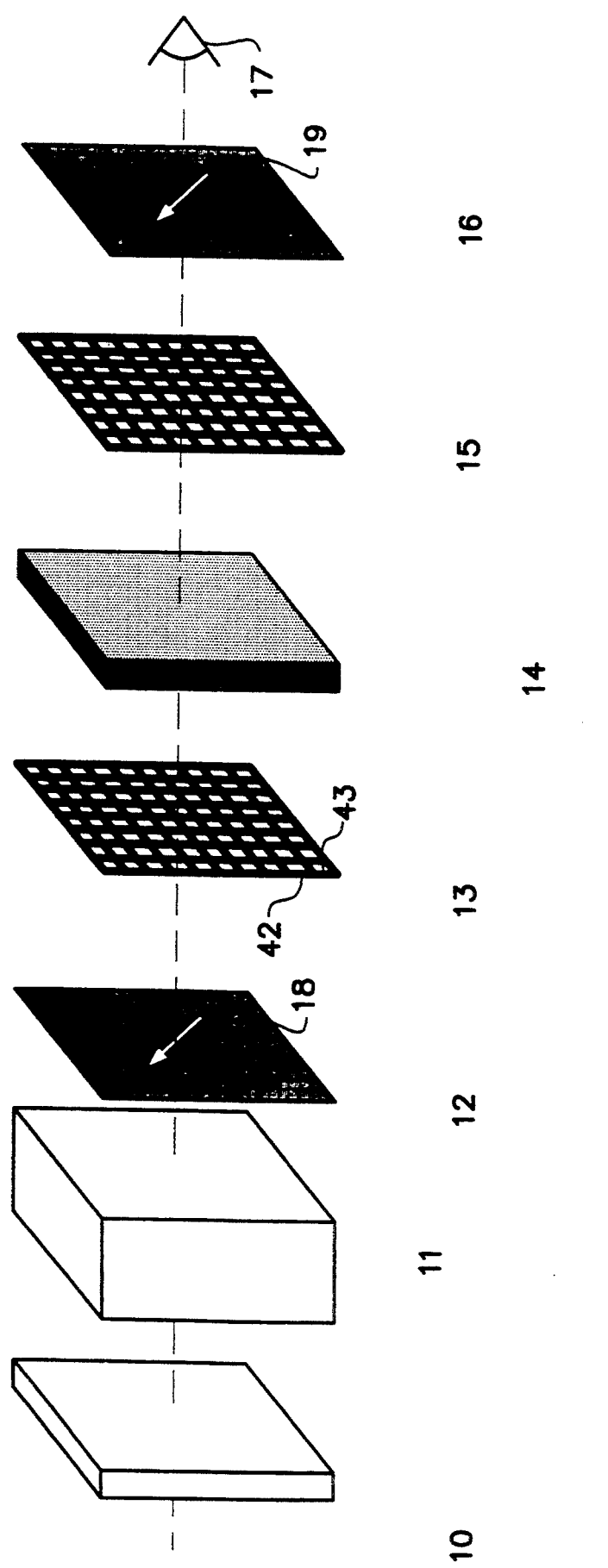
FIG. 1 is a schematic exploded three-dimensional view illustrating elements of an LCD module assembly including the patterned mirror of the present invention.

Referring to FIG. 1, an LCD module assembly is illustrated comprising a backlight reflector 10, a backlight assembly 11, a rear polarizer 12, a patterned mirror 13, a glass LCD cell substrate 14, a black matrix 15 and a front polarizer 16. The display is viewed from the front by an observer schematically represented at 17. The elements 10–12 and 14–16 comprise the components of the prior art LCD. The patterned mirror 13 is included in the structure in accordance with the present invention in a manner to be described. Details of the prior art structure are described in said Ser. No. 850,174.

In the preferred embodiment, the LCD cells 14 comprise a TFT active matrix of dot electrode pixels with color filters to provide a full color display and utilize TFT array active matrix addressing in the manner described in said Ser. No. 850,174. The pixels of the LCD cells 14 may be arranged in RED, GREEN and BLUE color triads in a diagonal or delta element array in a manner known in the art. The black matrix 15 provides optical separation between the color pixel filters of the LCD cells 14 in the assembled structure. During activation of a pixel of the LCD cells 14 by TFT addressing signals, in a manner to be described, the polarization axis of light passing through the pixel is not rotated. In the absence of activation signals, the polarization of the light is rotated. Thus, the LCD cells 14 may be considered as an optical rotator of the polarization of the light transmitted therethrough.

Light from the backlight assembly 11 propagates through the rear polarizer 12 and is polarized in a direction indicated by arrow 18. Light impinging upon the backlight reflector 10 is reflected forward through the assembly. The polarized light propagates through the patterned mirror assembly 13, in a manner to be further described, to impinge on the LCD cells 14. Light propagates through the pixels of the LCD cells 14 in accordance with the image to be created. The image propagates through the color filters (not shown) separated by the black matrix 15 and then through the front polarizer 16 to the observer 17. Only light polarized in the direction of arrow 19 propagates through the front polarizer 16. The polarization direction 19 of the front polarizer 16 is parallel to the polarization direction 18 of the rear polarizer 12. In the presence of polarization rotation introduced by the optical rotator 14, the parallel polarizers 12 and 16 will block light from the backlight assembly 11 from propagating to the observer 17. Thus, the device operates in a normally black mode in the off state. When a voltage is applied to the pixels of the optical rotator 14, the optical rotation properties thereof are disrupted and light propagates through the parallel polarizers 12 and 16 to the observer 17.

In the absence of the patterned mirror 13, light from the backlight assembly 11 impinging on the black matrix 15 is absorbed therein and obstructed from propagating through to the observer 17. In accordance with one aspect of the invention, the patterned mirror 13 reflects this otherwise lost light back to the backlight assembly 11. This light is then reflected forward by the backlight reflector 10 ultimately propagating through transmissive portions of the display to the observer 17. In this manner the luminance output of the display is improved. In accordance with another aspect of the invention, parallax between the black matrix 15 and the patterned mirror 13 with respect to viewing the display from off-axis angles provides improvements in off-axis-angle performance profiles, in a manner to be further described. The patterned mirror 13 is comprised of mirror portions 42 and apertures 43 to be further described with respect to FIGS. 3 and 4A–4D.

Figure 2:
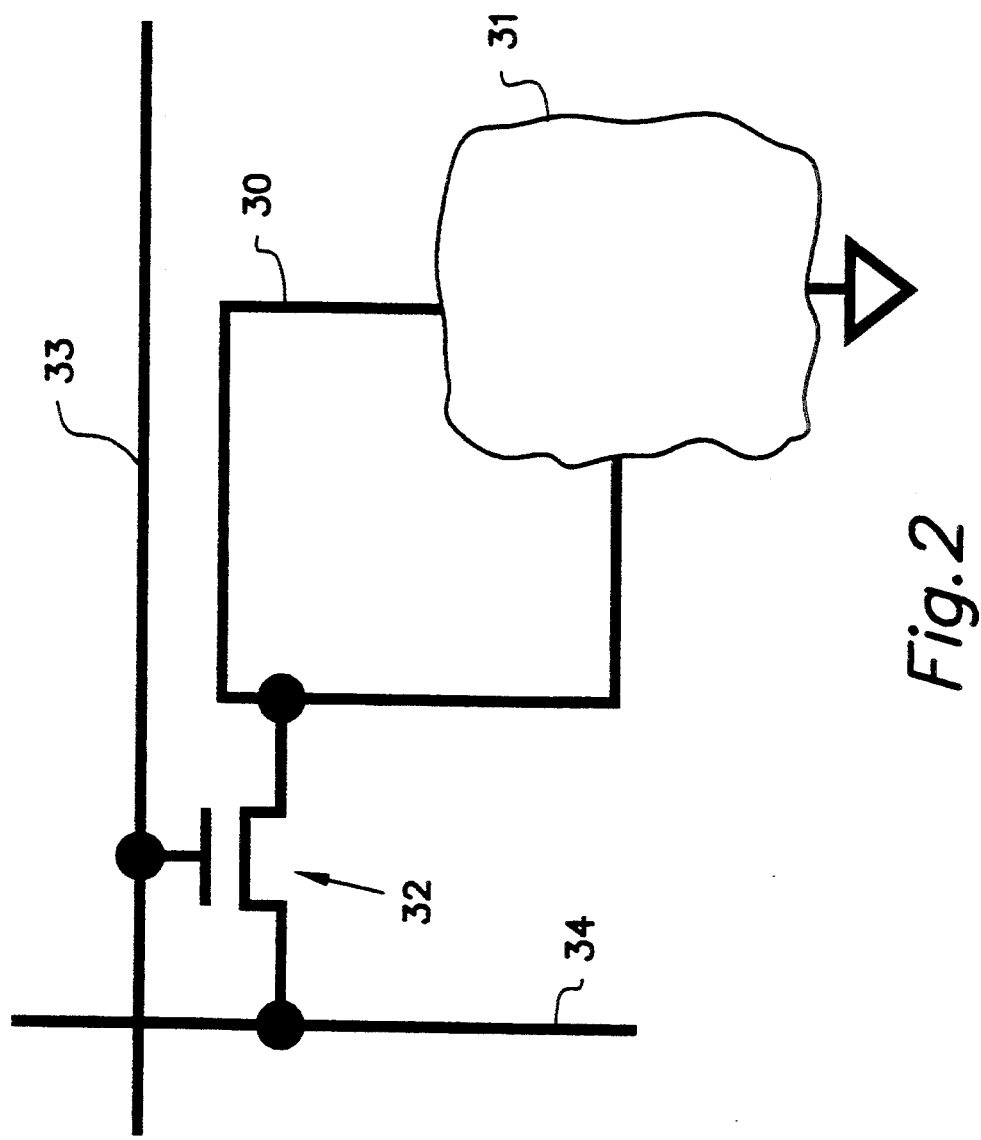
FIG. 2 is a schematic plan view of a TFT active matrix pixel.

Referring to FIG. 2, details of the TFT array active matrix addressing of a pixel of the LCD cells 14 of FIG. 1 is illustrated. The pixel includes a transparent metal electrode 30 preferably implemented with ITC). Disposed parallel to the pixel electrode 30 is the display common electrode 31. The electrode 31 is preferably constructed of ITO and is spaced from the electrode 30. The volume between the electrodes is filled with liquid crystal material in a well known manner. The pixel is activated by a Thin Film Transistor (TFT) 32 from a row electrode bus 33 and a column electrode bus 34 in the manner described in said Ser. No. 850,174. As described in said Ser. No. 850,174, the pixel electrode 30 forms the drain electrode of the TFT 32.

Referring to FIG. 3, in which like reference numerals indicate like components with respect to FIGS. 1 and 2, details of the patterned mirror 13, LCD cells 14 and black matrix 15 are illustrated. The structure is sandwiched between an upper glass substrate 40 and a lower glass substrate 41 with the front polarizer 16 and the rear polarizer 12 disposed outside the front and rear of the structure, respectively. Adjacent the lower glass substrate 41 and rear polarizer 12 is the patterned mirror 13 comprised of mirrored sections 42 and apertures 43. The apertures 43 are comprised of a transparent metal ITO layer formed therein. The mirrored sections 42 are arranged to reflect light back toward the backlight assembly 11. Disposed adjacent the patterned mirror 13 is the TFT active matrix LCD pixel layer (LCD cell ) 14. As described in said Ser. No. 850,174 and above with respect to FIG. 2, liquid crystal material 44 is sandwiched between the pixel electrode 30 and the common electrode 31. The TFT 32 is illustrated energizing the pixel electrode 30 from the conductive bus 34. Disposed adjacent the common electrode 31 is the color filter 45 optically defined within the black matrix 15. The upper glass substrate 40 and front polarizer 16 are disposed adjacent the color filter 45. It is noted that the structure is illustrated as a monogap display (see said Ser. No. 850,174).

A light ray 46 emanating from the backlight assembly 11 that, in the absence of the patterned mirror 13, would impinge on the black matrix 15 and be absorbed thereby, is reflected from the mirror 42 back into the backlight assembly 11 and again by the backlight reflector 10 through the transmissive portions of the display to the observer 17. Thus, the present invention provides an increase in luminance compared to the prior art structure which does not include the patterned mirror 13.

It is appreciated that as the observer 17 moves from an on-axis position to an off-axis position, the parallax relationship between the black matrix 15 and the mirror portions 42 vary. Thus, in accordance with the invention, the luminance versus viewing angle profiles of the display can be controlled by appropriately shaping the mirror portions 42. As the observer 17 moves off-axis from the display, the transmission of the LCD cell varies depending upon the obstruction presented by the patterned mirror 13 as seen through the black matrix 15. As observed from FIG. 1, the pattern of the mirror portions 42 approximates that of the black matrix 15 in shape. In the embodiment of FIG. 1, the apertures of the black matrix 15 are rectangular and the apertures of the patterned mirror 13 are also rectangular. It is appreciated, however, that the pattern of the mirror portions 42 need not approximate that of the black matrix 15 in shape but could be another shape. The shape of the patterned mirror portions 42 and the apertures 43 are selected depending upon the off-axis luminance performance that is desired. These shapes of the patterned mirror structure 13 could be significantly different from that of the black matrix 15.

Figure 4A:
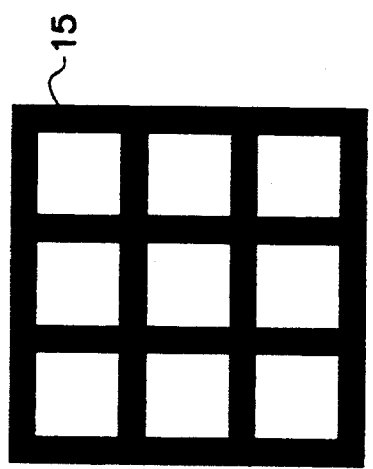
FIGS. 4A–4D are elevation views of the black matrix and patterned mirror components of the present invention illustrating parallax relationships therebetween.
Figure 4D:
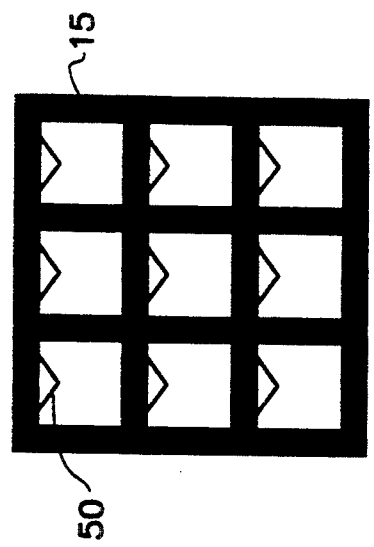
Figure 4B:
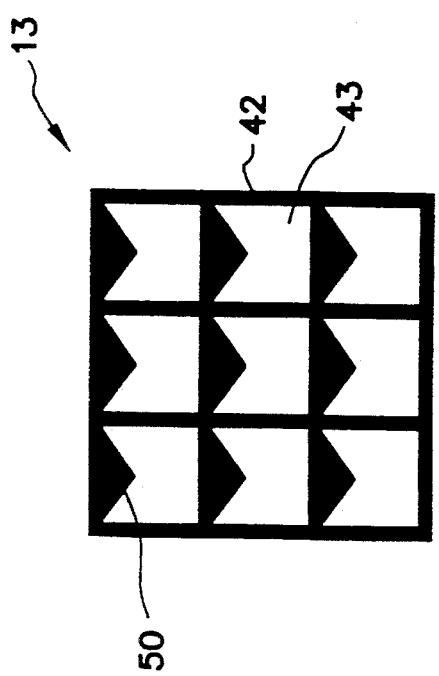
Figure 4C:
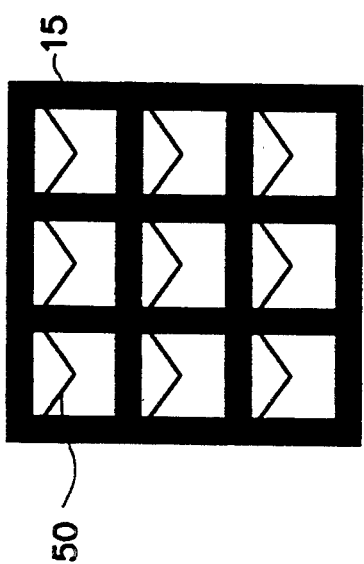

FIGS. 4A–4D illustrate how the invention improves the luminance versus off-axis-angle performance by using the parallax between the patterned mirror 13 and the black matrix 15 of the LCD cells 14 (or other opaque obstruction). Referring to FIGS. 4A–4D, in which like reference numerals indicate like components with respect to FIGS. 1 and 3, FIG. 4A illustrates the black matrix 15 with rectangular apertures. FIG. 4B illustrates the patterned mirror structure 13 with generally rectangular apertures 43, but with triangularly shaped mirror section protuberances 50 projecting therein. FIG. 4C illustrates the view normal to the display showing the protuberances 50 projecting into the transmissive aperture portions of the pixels. It is appreciated that while the protuberances 50 reflect light back to the backlight assembly 11 (FIG. 3), these protuberances also present obstructions as viewed through the black matrix 15. These obstructions tend to decrease the light transmission through the LCD cells. FIG. 4D illustrates a view that is off axis with respect to the display showing that less of the triangular portuberances 50 is obstructing the light transmission compared to the normal view of FIG. 4C. The resulting increase in luminance offsets the usual on-state luminance decrease at off-axis angles thereby tending to flatten the luminance profiles.

It is appreciated from the foregoing, that the luminance output of the display is improved by the present invention by reflecting normally absorbed light into the backlight assembly and then forward to the observer through transmissive portions of the display. The on-axis luminance is thereby increased since otherwise "lost" light is reflected into the backlight assembly. The off-axis luminance performance and profiles can be tailored to specific requirements by designing the appropriate parallax performance between the front black matrix 15 and the rear patterned mirror 13. On-axis and off-axis luminance performance can be traded off with respect to each other to provide the desired characteristics. The design process to tailor luminance profiles uses simple known geometrical concepts involving parallax. No sophisticated optical modeling for birefringent media is required.

The invention is compatible with other LCD luminance improvement techniques; e.g., multigap filters, retardation films, half-tone pixels and the like. The invention is one more "tool" in the LCD designer's "tool box" that can be used alone or in combination with other techniques. The patterned mirror 13 is fabricated utilizing standard photolithographic procedures already in use in the LCD industry.

It is appreciated that the improved performance effected by the present invention in luminance increase and luminance versus viewing angle performance may be obtained in both monochrome and color LCD displays.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A backlighted liquid crystal display (LCD) having a front from which the display is viewed at a viewing angle and a luminance at the front comprising
    an array of light transmissive LCD cells,
    a backlight assembly for generating and directing light toward said array of LCD cells,
    a backlight reflector positioned adjacent said backlight assembly to reflect light incident thereto toward said array of LCD cells,
    a light obstructing member comprising an opaque grid with first light transmissive apertures therethrough optically delineating said array of LCD cells, a patterned mirror, disposed intermediate said backlight assembly and said light obstructing member, comprising a mirror grid with second light transmissive apertures therethrough, said mirror grid aligned with said opaque grid to reflect light directed to said opaque grid toward said backlight assembly for reflection of light from said backlight reflector towards said first and second light transmissive apertures and said LCD cells, and protuberances respectively extending into said second apertures to establish shapes of said second apertures that are different from shapes of said first apertures so that said luminance varies in accordance with parallax between said light obstructing member and said patterned mirror in a predetermined manner as said viewing angle changes.

2. The display of claim 1 wherein said protuberances have triangular shapes.

* * * * *